(12) United States Patent
Park et al.

(10) Patent No.: US 8,909,826 B2
(45) Date of Patent: Dec. 9, 2014

(54) SYSTEM AND METHOD FOR EXTENDING USER-INTERFACE, AND STORAGE MEDIUM STORING THE SAME

(71) Applicant: Electronics and Telecommunications Research Institute, Daejeon (KR)

(72) Inventors: Ju Young Park, Daejeon (KR); Do Young Kim, Daejeon (KR); In Seon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/802,341

(22) Filed: Mar. 13, 2013

(65) Prior Publication Data

US 2013/0246662 A1    Sep. 19, 2013

(30) Foreign Application Priority Data

Mar. 14, 2012 (KR) .................. 10-2012-0026153
Sep. 28, 2012 (KR) .................. 10-2012-0109191

(51) Int. Cl.
*G06F 3/00*    (2006.01)
*G06F 5/00*    (2006.01)
*G06F 13/12*   (2006.01)

(52) U.S. Cl.
CPC .................. *G06F 13/126* (2013.01)
USPC ............................. 710/37; 710/5

(58) Field of Classification Search
CPC ....... G06F 3/048; G06F 15/173; G06F 15/16; H04K 1/10
USPC ........................................ 710/5, 37
See application file for complete search history.

(56) References Cited

U.S. PATENT DOCUMENTS

| | | | |
|---|---|---|---|
| 6,484,257 B1 * | 11/2002 | Ellis .............................. | 713/153 |
| 2006/0105760 A1 * | 5/2006 | Shamoon et al. ............. | 455/423 |
| 2010/0153857 A1 * | 6/2010 | Sanchez et al. ............... | 715/756 |
| 2011/0047266 A1 * | 2/2011 | Yu et al. ........................ | 709/224 |

FOREIGN PATENT DOCUMENTS

| | | |
|---|---|---|
| JP | 2011-76437 A | 4/2011 |
| KR | 10-2008-0103616 A | 11/2008 |
| KR | 10-2011-0020137 A | 3/2011 |
| KR | 10-2011-0127859 A | 11/2011 |

* cited by examiner

*Primary Examiner* — Farley Abad

(57) ABSTRACT

Disclosed are a system and a method for extending a user interface. A system for extending a user interface according to the present invention includes a master configured to generate or manage a session between devices in order to extend the user interface to a peripheral device of a user that includes a user terminal; and an input/output (I/O) device including the user terminal configured to receive a command for controlling a device that is included in the session generated or managed by the master, or to output or execute the command for controlling the device that is transferred through the session. According to the present invention, users of a smart terminal having a limited input/output interface may extend a user interface using widely used information and communication technology (ICT) peripheral devices (a monitor, a printer, a keyboard, a mouse, and the like).

14 Claims, 5 Drawing Sheets

SYSTEM AND METHOD FOR EXTENDING USER-INTERFACE, AND STORAGE MEDIUM STORING THE SAME

CROSS-REFERENCE TO RELATED APPLICATIONS

This application claims priority to and the benefit of Korean Patent Application No. 10-2012-0026153 filed on Mar. 14, 2012 and 10-2012-0109191 filed on Sep. 28, 2012 in the Korean Intellectual Property Office, the entire contents of which are incorporated herein by reference.

TECHNICAL FIELD

The present invention relates to a method that enables a user of a terminal having a limited user interface (UI) to use information and communication technology (ICT) peripheral devices (a keyboard, a monitor, a printer, a storage, and the like) installed in a predetermined place as if the ICT peripheral devices are connected to the terminal of the user when the user visits a place such as a café and the like.

BACKGROUND ART

In the related arts, a technology that enables a user to work together with another user by searching for peripheral devices or by sharing content of the user using a public desk is widely used. In existing technologies, a user uses peripheral devices using a smart terminal of the user (a bonjour protocol, a universal plug and play (UPNP) protocol), or uses a peripheral device by moving smart terminal contents of the user to the peripheral device.

The related arts have desired to propose a method that enables cooperation or may use peripheral devices using a smart terminal. However, even though an available peripheral device is present nearby, there is an issue that it is impossible to control the smart terminal using the peripheral device, or an expensive cooperation environment needs to be purchased.

SUMMARY OF THE INVENTION

The present invention has been made in an effort to extend a limited user interface of a smart terminal by enabling a user using the smart terminal (a smart phone, a smart pad, an E-book, and the like) to use a peripheral input/output (I/O) device.

The present invention is to improve work efficiency by enabling an I/O device already included in a smart terminal to freely perform input/output as if the I/O device is directly connected to the smart terminal.

An exemplary embodiment of the present invention provides a system for extending a user interface, the system including a master configured to generate or manage a session between devices in order to extend the user interface to a peripheral device of a user that includes a user terminal; and the user terminal configured to receive a command for controlling a device that is included in the session generated or managed by the master, or to output or execute the command for controlling the device that is transferred through the session.

The I/O device may include a session generation request terminal configured to request the master for generating the session, and the master may receive the request for generating the session, and determine whether to generate the session based on whether a resource of the master permits.

The I/O device may include a session join request terminal configured to request the master for joining the session generated by the master, and the master may receive the join request of the session, and approve the session join of the session join request terminal based on whether the session generation request terminal approves the session join.

The master may inform a terminal joining the session about the session join of the session join request terminal.

The session generation request terminal may control an access of the session join request terminal joining the session with respect to the device that is included in the session.

The session generation request terminal may request the master for terminating the session generated or managed by the master, and the master may inform a terminal joining the session about termination of the session.

The I/O device may include a peripheral device that is connected to the master over a wired or wireless network and is configured to execute a received input/output command, and the peripheral device may control the user terminal or be controlled by the user terminal.

The I/O device may include a text input device configured to receive text information from the user, and a character string received by the character string input device may be transferred to the user terminal as an input of the user terminal through the session.

The I/O device may include a data output device configured to output visualized data to an outside, and the data output from the data output device may be data of the user terminal that is transferred through the session.

The user terminal joining the session may share data present within the session, and the user interface of the user terminal may be extended to access and control the shared data.

The master may have identification information for being distinguished from other masters, and the identification information may be only one within a network including the master.

The user terminal may select the master that generates or manages the session between the devices in order to extend the user interface using the identification information of the master.

The user terminal may have identification information for being distinguished from other terminals that are included in the session generated or managed by the master, and the identification information may be only one within the session.

Another exemplary embodiment of the present invention provides a terminal of supporting extension of a user interface, the terminal including an output unit configured to output a command for controlling a device that is included in a session generated or managed in order to extend the user interface to a peripheral device of a user that includes a user terminal; and an input unit configured to receive a command for controlling the terminal that is transferred through the session.

Still another exemplary embodiment of the present invention provides a method of extending a user interface, the method including a session generation requesting operation in which a user terminal requests a master for generating a session, the master generating or managing a session between devices in order to extend the user interface to a peripheral device of a user that includes the user terminal; a session generation determining operation in which the master receives the request for generating the session in the session generation requesting operation and determines whether to generate the session based on whether a resource of the master permits; and an interface performing operation in which an I/O device including the user terminal receives a command for controlling a device that is included in the session using the session generated in the session generation determining operation, or outputs or executes the command for controlling the device that is transferred through the session.

Prior to the interface performing operation, the user interface extending method may further include a session join requesting operation in which the user terminal requests the master for joining the session generated by the master; a join approving operation in which the master receives the join request of the session and approves session join of a terminal requesting the session join based on whether a terminal requesting the session generation approves the session join. The I/O device of the interface performing operation may include the user terminal of which the session join is approved.

The master may inform a terminal joining the session about the session join of the user terminal of which the session join is approved.

The terminal requesting the session generation may control an access of the terminal of which the session join is approved with respect to the device that is included in the session.

The terminal requesting the session generation may request the master for terminating the session generated or managed by the master, and the master may inform a terminal joining the session about termination of that the session.

The I/O device may include a peripheral device that is connected to the master over a wired or wireless network and is configured to execute a received input/output command, and the peripheral device may control the user terminal or may be controlled by the terminal.

Yet another exemplary embodiment of the present invention provides a computer-readable storage medium storing a program to implement a method of extending a user interface including a session generation requesting operation in which a user terminal requests a master for generating a session, the master generating or managing a session between devices in order to extend the user interface to a peripheral device of a user that includes the user terminal; a session generation determining operation in which the master receives the request for generating the session in the session generation requesting operation and determines whether to generate the session based on whether a resource of the master permits; and an interface performing operation in which an I/O device including the user terminal receives a command for controlling a device that is included in the session using the session generated in the session generation determining operation, or outputs or executes the command for controlling the device that is transferred through the session.

According to exemplary embodiments of the present invention, users of a smart terminal having a limited I/O interface may extend the user interface using widely used information and communication technology (ICT) peripheral devices (a monitor, a printer, a keyboard, a mouse, and the like).

The smart terminal users may use various input/output interfaces in a place where a smart table service is available, as if the input/output interfaces are connected to their own smart terminal.

The present invention provides a method of using an existing peripheral I/O device as is. Accordingly, users who desire to use a smart table service may use the service by simply installing a smart table master function in a set-top box enabling the smart table master function or an existing personal computer (PC) without a need to purchase an additional peripheral device. Accordingly, it is advantageous in an aspect of cost. Existing users who have difficulty in operating due to a limited input/output interface of a smart terminal may further easily work using a peripheral device as if they are using a general PC. Cooperation may be easily enabled by providing a function of effectively sharing data between users who participate into the smart table service.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
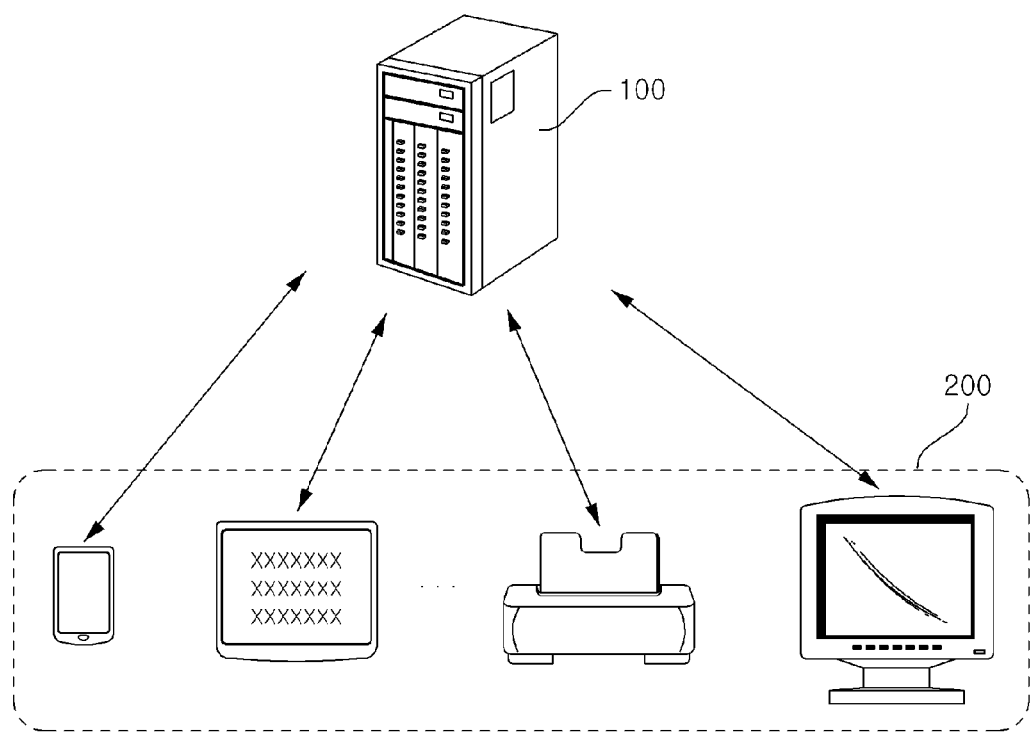
FIG. 1 is an exemplary diagram illustrating a configuration of a system for extending a user interface according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description simply describes a principle of the invention. Accordingly, even though not clearly described in the present specification or not illustrated here, those skilled in the art may embody the principle of the invention and invent various devices included in the concept and range of the invention. All of the conditional terminologies and exemplary embodiments described in the present specification are as a rule intended only for the purpose of understanding the concept of the invention and thus, should be understood not to be limited to particularly described exemplary embodiments and states.

All of the detailed description describing a predetermined exemplary embodiment as well as the principle, perspectives, and exemplary embodiments of the invention should be understood to include structure and functional equivalents of the above matter. Such equivalents should be understood to include equivalents to be developed in the future as well as currently known equivalents, that is, all of the devices that are invented to perform the same or similar function regardless of a structure thereof.

When it is determined that the detailed description related to a related known function or configuration may make the purpose of the invention unnecessarily ambiguous in describing the invention, the detailed description will be omitted here. Hereinafter, exemplary embodiments of the invention will be described in detail with reference to the accompanying drawings.

FIG. 1 is an exemplary diagram illustrating a configuration of a system for extending a user interface (hereinafter, a user interface extending system) according to an exemplary embodiment of the present invention. Referring to FIG. 1, the user interface extending system according to the present exemplary embodiment includes a master 100 and an I/O device 200.

The master 100 generates or manages a session between devices in order to extend the user interface to a peripheral device of a user that includes a user terminal 210.

The user terminal 210 is a user device for using the user interface extending system proposed in the present invention, and includes a mobile device such as a mobile phone, a tablet PC, and the like, as well as a computer capable of performing network communication. The peripheral device of the user to which the user interface is extended includes a device to receive and perform the user interface, includes a keyboard or a mouse as a general input device, and includes a television (TV), a monitor, a beam projector, and the like as a display device.

In the present exemplary embodiment, extending the user interface indicates extending, up to a peripheral device 220 included in a session joined by a terminal in addition to the user terminal 210 physically held by the user, the utilization range of the user interface that helps interaction between two sides, a user and a system, to be smoothly performed between the two sides. Accordingly, in the present exemplary embodiment, in order to provide the user terminal 210 with an input/output supporting function that is a service performed by peripheral devices 220 connected to the master 100, the master 100 serves to generate a session as a connection relationship between the user terminal 210 and the peripheral device 220 and to manage the session.

The I/O device 200 includes the user terminal 210 to receive a command for controlling a device that is included in the session generated or managed by the master 100, or to output or execute the command for controlling the device that is transferred through the session. The I/O device 200 includes the user terminal 210 that requests the master 100 according to the present exemplary embodiment for generating or joining the session, is directly applied to extension of the user interface, and uses the same, and includes information and communication technology (ICT) peripheral devices 220 that execute a command according to the extended user interface.

The master 100 provides the user terminal 210 with an input/output supporting function that is a service performed by the ICT peripheral devices 220 connected to the master 100. For example, the master 100 may display a display with a limited size of the user terminal 210 through a large monitor that is one of the peripheral devices 220 of the smart table master 100. As an example, the master 100 may output a file within the user terminal 210 through the peripheral device 220 of the master 100 without separate setting.

The user terminal 210 may include an output unit to output a command for controlling a device that is included in a session generated or managed in order to extend the user interface 210 to the peripheral device 220 of a user that includes the user terminal 210, and an input unit to receive a command for controlling the terminal that is transferred through the session.

Accordingly, in the user terminal 210 that receives the command for controlling the device that is included in the session or outputs the command for controlling the device that is transferred through the session, the command may be an input/output control command of the peripheral device 220 through the user terminal 210 that is included in the session. Control of the peripheral device 220 through the user terminal 210 may be controlling a screen displayed on the user terminal 210 to be displayed or printed through the peripheral device 220, or may be controlling an operation of the peripheral device 220 itself.

Accordingly, in the present exemplary embodiment, the I/O device 200 may include the peripheral device 220 that is connected to the master 100 over a wired or wireless network, and is configured to execute a received input/output command, and the peripheral device 220 may control the user terminal 210 or may be controlled by the user terminal 210. The I/O device 200 may include a text input device to receive text information from the user. A character string received by the text input device may be transferred to the user terminal 210 as an input of the user terminal 210 through the session. The I/O device 200 may include a data output device to output visualized data to an outside, and the data output from the data output device may be data of the user terminal 210 that is transferred through the session.

It is possible to control the user terminal 210 using an input device (for example, a keyboard, a mouse, and the like) that is the peripheral device 220 of the master 100.

Accordingly, in the user terminal 210 that executes the command for controlling the device that is transferred through the session, the command may be an input/output control command of the user terminal 210 through control or the peripheral device 220. Control of the user terminal 210 through the peripheral device 220 may be predetermined manipulations for synchronizing control of the peripheral device 220 and control of the user terminal 210, such as recognizing text information input through the peripheral device 220 as input information of the user terminal 210, transmitting data processed by the peripheral device 220, and the like. When a plurality of user terminals 210 joins the session, input/output control between the plurality of user terminals 210 is also included.

Figure 2:
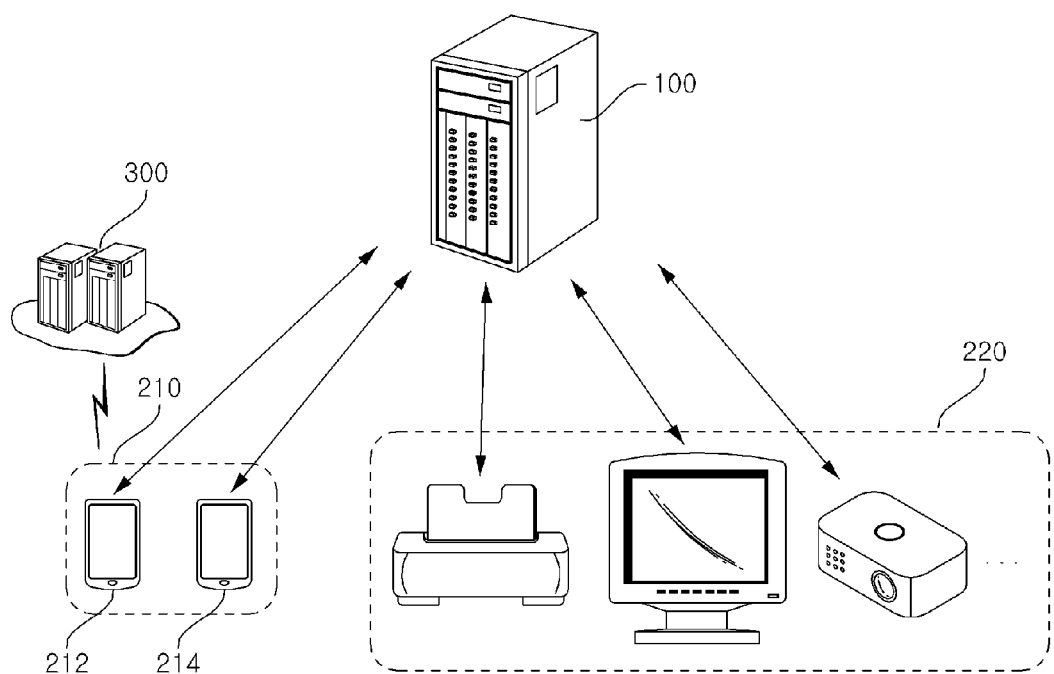
FIG. 2 is an exemplary diagram illustrating a detailed configuration of a system for extending a user interface according to an exemplary embodiment of the present invention.

FIG. 2 is an exemplary diagram illustrating a detailed configuration of a user interface extending system according to an exemplary embodiment of the present invention. Referring to FIG. 2, as described above, the I/O device 200 of the user interface extending system according to the present exemplary embodiment includes the user terminal 210 that is directly applied by extension of the user interface and the peripheral device 220 to execute a command according to the extended user interface. The user terminal 210 may access data present in a network server 300 through cloud computing, and may output or process data downloaded from the network server 300 through the peripheral device 220.

In the present exemplary embodiment, the I/O device 200, more specifically, the user terminal 210 includes a session generation request terminal 212 to request the master 100 for generating the session. The master 100 may receive the request for generating the session, and may determine whether to generate the session based on whether a resource of the master 100 permits.

The I/O device 200 includes a session join request terminal 214 to request the master 100 for joining the session generated by the master 100. The master 100 may receive the join request of the session, and approve the session join of the session join request terminal 214 based on whether the session generation request terminal 212 approves the session join. In the present exemplary embodiment, when the session join of the session join request terminal 214 is approved, the master 100 informs other terminals joining the session about the session join of the session join request terminal 214.

The generated session is terminated in such a manner that the session generation request terminal 212 requests the master 100 for terminating the session generated or managed by the master 100, and the master 100 informs a terminal joining the session about termination of the session. Hereinafter, a method of processing a request from the user terminal 210, such as generation or join of the session and the like, according to the present exemplary embodiment will be described with reference to FIG. 3.

Figure 3:
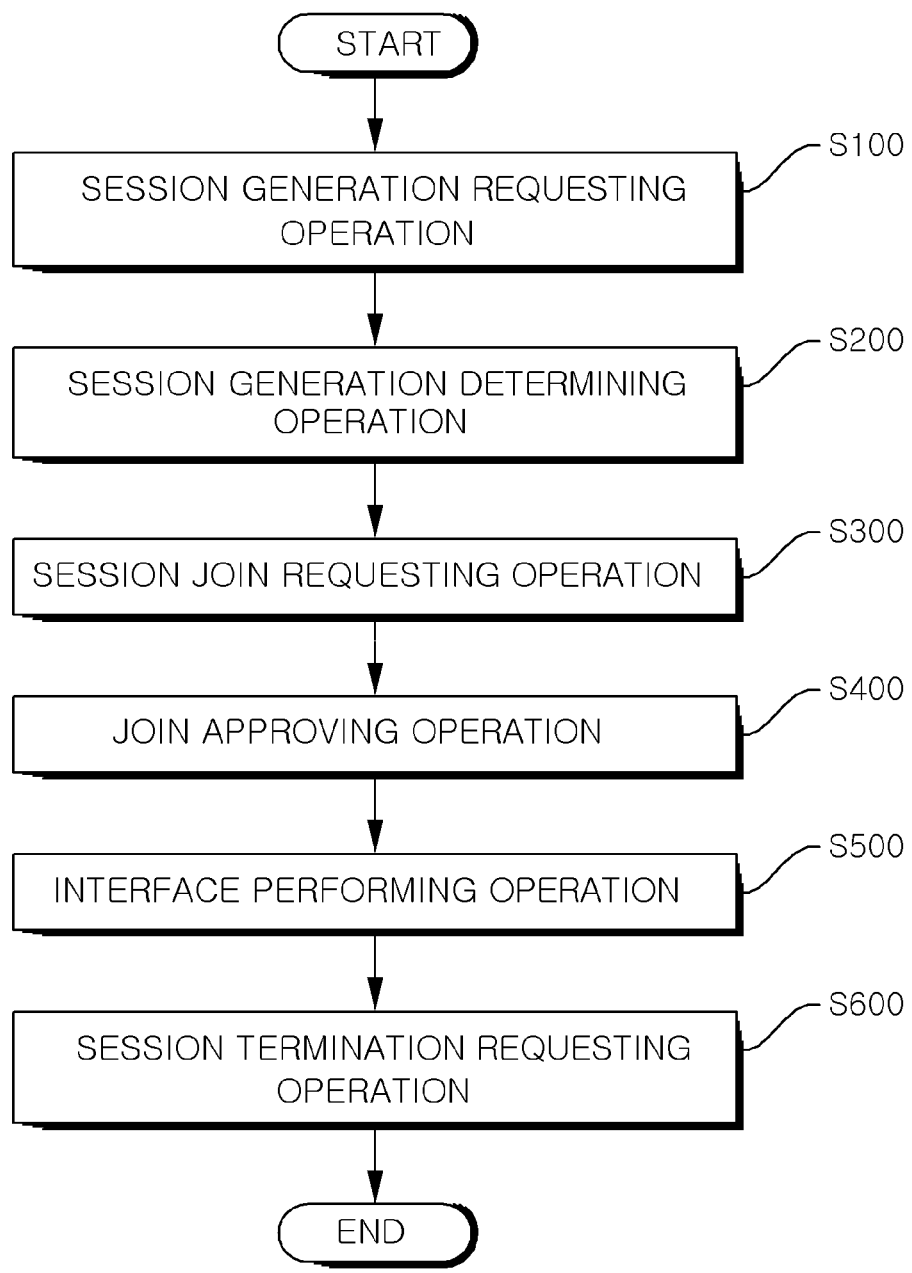
FIG. 3 is a flowchart illustrating a method of extending a user interface according to an exemplary embodiment of the present invention.

FIG. 3 is a flowchart illustrating a method of extending a user interface (hereinafter, a user interface extending method) according to an exemplary embodiment of the present invention. Referring to FIG. 3, control of a smart table service session according to the present exemplary embodiment is performed through a session generation requesting operation S100, a session generation determining operation S200, a session join requesting operation S300, a join approving operation S400, an interface performing operation S500, and a session termination requesting operation S600.

Figure 4:
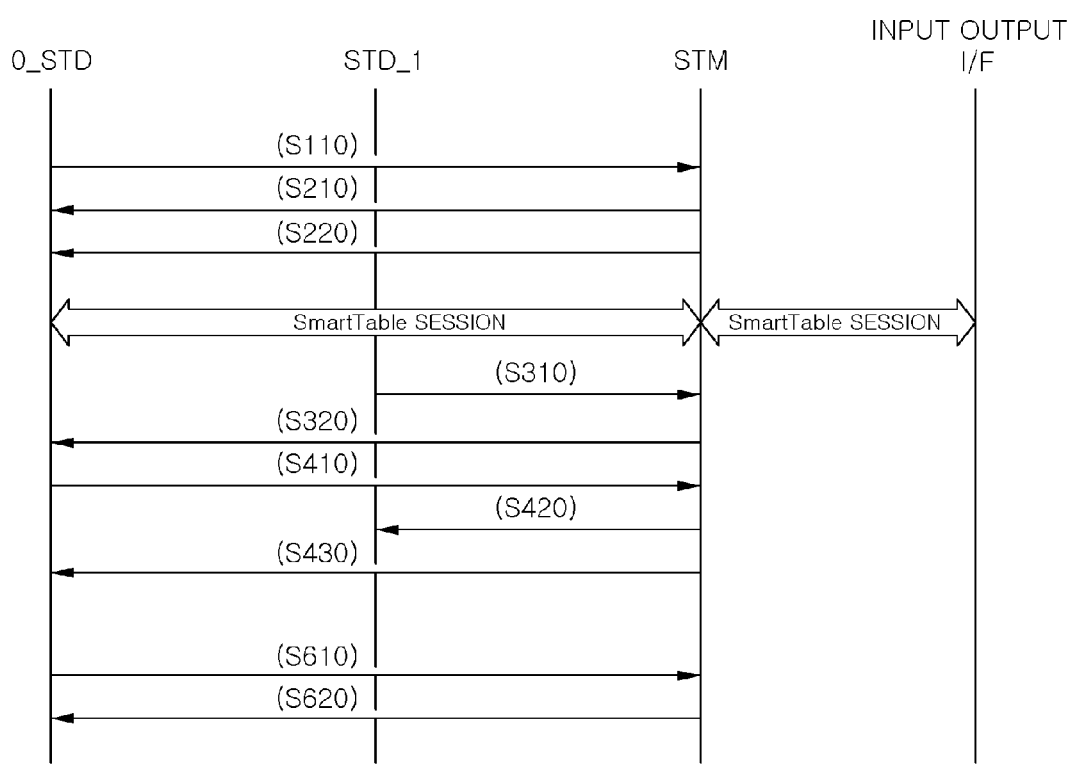
FIG. 4 is a flowchart illustrating an operation of generating and controlling a session in a method of extending a user interface according to an exemplary embodiment of the present invention.

An operation of generating and controlling a session in the user interface extending method according to the present exemplary embodiment will be described with reference to FIG. 4. Referring to FIG. 4, a smart table is an environment configured using a user interface extending system according to the present invention and is an environment that provides a function capable of extending a limited interface of a smart terminal device owned by an individual through available peripheral devices. The smart table does not indicate an "object with a specific shape such as a table", as indicated by its name, but indicates a logical environment that enables a smart device user to use peripheral interfaces. The smart table may be configured in a software (S/W) form or a hardware (H/W) form such as a set-top box. The smart table service is an interface extending service that is provided from the user interface extending system according to the present exemplary embodiment. The master 100, connected to various ICT I/O devices such as a monitor, a keyboard, and a printer, provides a smart table service (STS) to the user terminals 210. Here, the session generation request terminal 212 that initially requests the smart table service is referred to as an owner STD (O_STD), and the user terminal 210 that participates into a smart table service session generated by the O_STD is indicated as an STD_1.

An STM indicates the master 100 in the present exemplary embodiment, more particularly, a smart table master that manages the smart table service. The STM serves to provide the STD with functions of peripheral devices that may be used in public. The STM is connected to peripheral devices of the STM in a wired or wireless manner, and mutually connected to the STD through wireless connection. Through a connected channel, the STM controls the STD or processes data.

The STD indicates a terminal in the present exemplary embodiment. Accordingly, the session in the present exemplary embodiment, more particularly, a smart table service session (STS session) includes a single STM and at least one STD. Among at least one STD, a node (the session generation request terminal 212) that has initially occupied the STM becomes the O_STD (owner STD), and uses resources that are provided from the STM. The O_STD may control the right to use an STM resource, and all of the O_STD and the STD may use a resource (a peripheral device, a shared folder) provided from the STM.

At least one STD needs to consider a racing condition about the I/O device/shared resource provided from the STM. For this, an STD that has initially joined the STM among STDs is referred to as the O_STD. Through this STD, flows of all of the STDs that use the same STM are controlled. An owner of the STD manages an STM join member approving procedure, and performs join/withdrawal of the STM, session termination (closure) of the STM, and token management for using an STM resource.

Meanwhile, at least one STD may participate within a single STS session. STDs present within the same session may mutually share their own resource (file). The STDs perform resource (folder, file) share, read/write flag control, and permission control (publication, partial publication, closure).

The STM may set its own unique ID. Through this STM_ID, an STD user is enabled to determine which STM to select. The STM that gets ready is present in a standby state for the STD, and the STD searches for/selects the STM through a "peripheral search function". Here, the STM provides STM_ID/Pass to the STD so that the STD may select the STM (displayed on a hardware terminal).

The STM shares a resource, such as storage/I/O device, and the like, with the STD. The STD may use a storage resource provided from the STM. Here, a use method may use the same scheme of using a folder of the network server 300 by downloading a resource from a shared folder of the STM or uploading the resource to the shared folder of the STM.

The STM needs to project a screen of the STD onto an STM peripheral device (monitor and the like). For this, the STM may project the screen of the STD onto a monitor or a beam projector that is a peripheral device of the STM. A file of the STD may be output through a printer of the STM.

The STM is connected to input/output peripheral devices of the STM through a standard input/output interface. Through this, the STM may redirect an output item (audio/video) of the STD to a peripheral device. The STM provides peripheral devices of the STM to the STD using the aforementioned resource expression scheme.

Hereinafter, a method of controlling a session such as generation and release of a smart service session and the like according to the present exemplary embodiment will be gradually described.

In the session generation requesting operation S100, a user terminal requests a master for generating a session. Here, the master generates or manages a session between devices in order to extend a user interface to a peripheral device of a user that includes the user terminal.

Accordingly, the O_STD requests the STM for a new STS (S110). In response thereto, in the session generation determining operation S200, the master receives the request for generating the session in the session generation requesting operation S100, and determines whether to generate the session based on whether a resource of the master permits. That is, when the resource of the STM permits, the STM accepts the request of the O_STD (S210) and also informs the O_STD about a state of an STS session (S220). Once the STS session is configured, the STS session capable of performing control and transmitting and receiving data is configured between the STM and the O_STD, and is also configured between the STM and an input/output peripheral device.

In the session join requesting operation S300, the user terminal requests the master for joining the session generated by the master. Accordingly, even when a new STD joins the generated STS, an operation similar to the aforementioned operation is performed. The new STD (the session join request terminal 214) requests the STM for joining the session (S310). Here, in the join approving operation S400, while whether to approve the session join of the O_STD is directly determined by the STM, the join request of the STD is inquired to the O_STD for approval (S320).

Accordingly, in the join approving operation S400, the master receives the join request of the session and approves session join of a terminal requesting the session join based on whether a terminal requesting the session generation approves the session join. When the O_STD approves the session join of the new STD (S410), the STM permits the session join of the new STD (S420) and informs all of the STDs joining the session about a session status (S430).

In the session termination requesting operation S600, the terminal requesting the session generation requests the master for terminating the session generated or managed by the master, and the master informs a terminal joining the session about termination of the session. That is, termination of the STS session is performed in such a manner that the O_STD requests the STM for STS termination (S610). In response thereto, the STM informs all of the STDs participating in the STS session that the STS session is terminated (S620), and releases an allocated STS session resource. Hereinafter, a method of performing an interface in the user interface extending method according to the present exemplary embodiment will be described with reference to FIG. 5.

In the interface performing operation S500, an I/O device including the user terminal receives a command for controlling a device that is included in the session using the session generated in the session generation determining operation S200, or outputs or executes the command for controlling the device that is transferred through the session.

Figure 5:
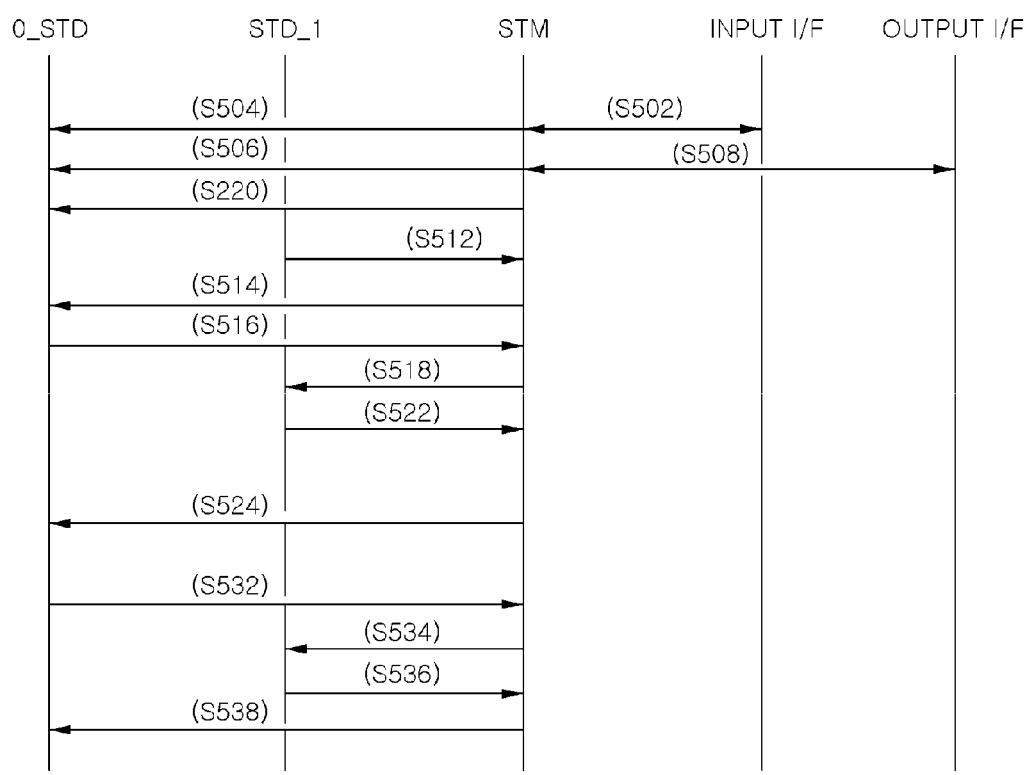
FIG. 5 is a flowchart illustrating control and data between a user terminal and an input/output (I/O) device in a session generated according to an exemplary embodiment of the present invention.

FIG. 5 is a flowchart illustrating control and data between a user terminal and an I/O device in a session generated according to an exemplary embodiment of the present invention.

A session generation request terminal controls an access of a session join request terminal joining a session with respect to a device that is included in the session. A user terminal joining the session shares data present within the session, and a user interface of the user terminal is extended to access and control the shared data.

Referring to FIG. 5, an STM having various input/output peripheral devices (input I/F, output I/F) shares functions of the input/output peripheral devices of the STM with STDs.

An input character string received from a keyboard that is one of the input peripheral devices (S502) extends an input function of an O_STD through the STM (S504). Similarly, a screen of the O_STD passes through the STM (S506) and is extended to an output peripheral device (S508).

An STD_1 that has joined an STS session later may also use an ICT peripheral device of the STM. STDs excluding the O_STD request the STM for permission to use the peripheral device. In the case of requesting the STM for using an input interface such as a keyboard (S512), the STM inquires the O_STD about whether to permit the use request of the STD_1 (S514). When approval is obtained from the O_STD (S516), the STM permits the STD_1 to use the input interface (S518). Operations 502 to 504 proceed in the same manner.

Here, a peripheral device of the STM may be simultaneously used only with a single STD. However, in the case of using different types of peripheral devices (for example, in the case in which the O_STD uses a monitor and the STD_1 uses a keyboard, the respectively different peripheral devices may be simultaneously used.

A use request for an output interface also proceeds in the same manner as the use request for the input interface.

A procedure of returning a use right of a peripheral device may consider two cases. The first case is a case in which the STD using the peripheral device actively returns the use right of the peripheral device. The STD returns the use right of the peripheral device to the STM (S522). The STM informs the O_STD about the returned use right (S524).

Another case is a case in which the O_STD compulsorily makes the STD return the use right while the STD is using the peripheral device (S532 to S538). The O_STD requests the STM for returning the use right of the peripheral device (S532). In response to the return request, the STM requests the STD using the corresponding peripheral device (among input or output interfaces) for returning the use right (S536). Through this, the STM returns the use right of the corresponding peripheral device to the O_STD (S538).

In the user interface extending system according to the present exemplary embodiment, the master may have identification information for being distinguished from other masters. The identification information may be only one within a network including the master. Using the identification information of the master, the user terminal may select a master that generates or manages a session between devices in order to extend the user interface.

The STM is identified using an identifier indicated in an STM device. This identifier needs to be only one within a physical distance in which the STM is present. Being only one indicates that in the case of accessing through wireless fidelity (Wi-Fi), the identifier needs to be a sole ID within the range of a Wi-Fi link. In the case of using 3G or long term evolution (LTE), a globally sole ID needs to be used.

The user terminal may have identification information for being distinguished from a terminal that is included in the session generated or managed by the master. The identification information may be only one within the session.

An identifier capable of identifying the STD needs to be only one within the STS session. A nickname may be used as an auxiliary means to easily express the identifier. An example of the nickname may be a telephone number of the STD, a false name, and the like. When a duplicate nickname is detected in the same session, it is possible to set the identifier by increasing an ID of an STD participating in the session later by "1".

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for extending a user interface, the system comprising:
   a master configured to generate and manage a session between devices in order to extend the user interface to a peripheral device of a user that includes a user terminal; and
   an input/output (I/O) device including the user terminal configured to receive a command for controlling a device that is included in the session generated and managed by the master, or to output or execute the command for controlling the device that is transferred through the session,
   wherein the I/O device includes a session generation request terminal configured to request the master for generating the session, and the master receives the request for generating the session, and determines whether to generate the session based on whether a resource of the master permits,
   wherein the I/O device includes a session join request terminal configured to request the master for joining the session generated by the master, and the master receives the join request of the session, and approves the session join of the session join request terminal based on whether the session generation request terminal approves the session join, and
   wherein the session generation request terminal controls an access of the session join request terminal joining the session with respect to the device that is included in the session.

2. The system of claim 1, wherein the master informs a terminal joining the session about the session join of the session join request terminal.

3. The system of claim 1, wherein the session generation request terminal requests the master for terminating the session generated or managed by the master, and the master informs a terminal joining the session about termination of the session.

4. The system of claim 1, wherein the I/O device includes a peripheral device that is connected to the master over a wired or wireless network and is configured to execute a received input/output command, and the peripheral device controls the user terminal or is controlled by the user terminal.

5. The system of claim 4, wherein the I/O device includes a text input device configured to receive text information from the user, and a character string received by the character string input device is transferred to the user terminal as an input of the user terminal through the session.

6. The system of claim 4, wherein the I/O device includes a data output device configured to output visualized data to an outside, and the data output from the data output device is data of the user terminal that is transferred through the session.

7. The system of claim 1, wherein the user terminal joining the session shares data present within the session, and the user interface of the user terminal is extended to access and control the shared data.

8. The system of claim 1, wherein the master has identification information for being distinguished from other masters, and the identification information is only one within a network including the master.

9. The system of claim 1, wherein the user terminal has identification information for being distinguished from other terminals that are included in the session generated or managed by the master, and the identification information is only one within the session.

10. A method of extending a user interface, the method comprising:
    a session generation requesting operation in which a user terminal requests a master for generating a session, the master generating or managing a session between devices in order to extend the user interface to a peripheral device of a user that includes the user terminal;
    a session generation determining operation in which the master receives the request for generating the session in the session generation requesting operation and determines whether to generate the session based on whether a resource of the master permits;
    an interface performing operation in which an I/O device including the user terminal receives a command for controlling a device that is included in the session using the session generated in the session generation determining operation, or outputs or executes the command for controlling the device that is transferred through the session;
    a session join requesting operation in which the user terminal requests the master for joining the session generated by the master; and
    a join approving operation in which the master receives the join request of the session and approves session join of a terminal requesting the session join based on whether a terminal requesting the session generation approves the session join, wherein the I/O device of the interface performing operation includes the user terminal of which the session join is approved,
    wherein the terminal requesting the session generation controls an access of the terminal of which the session join is approved with respect to the device that is included in the session.

11. The method of claim 10, wherein the master informs a terminal joining the session about the session join of the user terminal of which the session join is approved.

12. The method of claim 10, wherein the terminal requesting the session generation requests the master for terminating the session generated or managed by the master, and the master informs a terminal joining the session about termination of that the session.

13. The method of claim 10, wherein the I/O device includes a peripheral device that is connected to the master over a wired or wireless network and is configured to execute a received input/output command, and the peripheral device controls the user terminal or is controlled by the terminal.

14. A non-transitory computer-readable storage medium storing a program to implement a method of extending a user interface comprising:

a session generation requesting operation in which a user terminal requests a master for generating a session, the master generating or managing a session between devices in order to extend the user interface to a peripheral device of a user that includes the user terminal;

a session generation determining operation in which the master receives the request for generating the session in the session generation requesting operation and determines whether to generate the session based on whether a resource of the master permits;

an interface performing operation in which an I/O device including the user terminal receives a command for controlling a device that is included in the session using the session generated in the session generation determining operation, or outputs or executes the command for controlling the device that is transferred through the session;

a session join requesting operation in which the user terminal requests the master for joining the session generated by the master; and a join approving operation in which the master receives the join request of the session and approves session join of a terminal requesting the session join based on whether a terminal requesting the session generation approves the session join, wherein the I/O device of the interface performing operation includes the user terminal of which the session join is approved, wherein the terminal requesting the session generation controls an access of the terminal of which the session join is approved with respect to the device that is included in the session.

* * * * *